United States Patent
Wang et al.

(10) Patent No.: US 12,309,219 B2
(45) Date of Patent: May 20, 2025

(54) CONTENT SHARING METHOD, ELECTRONIC DEVICE, AND STORAGE MEDIUM

(71) Applicant: Huawei Technologies Co., Ltd., Shenzhen (CN)

(72) Inventors: Yilun Wang, Nanjing (CN); Zhenyu Guo, Shanghai (CN); Youhui Lin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/255,696

(22) PCT Filed: Nov. 29, 2021

(86) PCT No.: PCT/CN2021/133869
§ 371 (c)(1),
(2) Date: Jun. 2, 2023

(87) PCT Pub. No.: WO2022/116930
PCT Pub. Date: Jun. 9, 2022

(65) Prior Publication Data
US 2024/0422209 A1 Dec. 19, 2024

(30) Foreign Application Priority Data

Dec. 4, 2020 (CN) .......................... 202011411232.8

(51) Int. Cl.
*H04L 67/06* (2022.01)

(52) U.S. Cl.
CPC .................................. *H04L 67/06* (2013.01)

(58) Field of Classification Search
CPC ..... G06T 19/006; G06T 7/70; G06T 2200/24; G06F 3/0482; G06F 3/0486; G06F 3/04842; G06F 3/017; G06F 3/0488; G06F 3/012; G06F 16/9537; H04L 67/52;
(Continued)

(56) References Cited

U.S. PATENT DOCUMENTS

| | | | |
|---|---|---|---|
| 10,587,782 B1 * | 3/2020 | Barnes | H04N 5/04 |
| 2012/0290730 A1 * | 11/2012 | Desai | H04L 67/104 |
| | | | 709/228 |
| 2013/0050259 A1 | 2/2013 | Ahn et al. | |

(Continued)

FOREIGN PATENT DOCUMENTS

| | | | | |
|---|---|---|---|---|
| CN | 101174332 A | | 5/2008 | |
| CN | 105306870 A * | | 2/2016 | ......... H04L 12/6418 |

(Continued)

*Primary Examiner* — David R Lazaro
(74) *Attorney, Agent, or Firm* — Conley Rose, P.C.

(57) ABSTRACT

A content sharing method includes detecting a first operation performed by a user for content sharing, determining one or more shared files in response to the first operation, detecting a second operation performed by the user for selecting a second electronic device, determining the second electronic device in response to the second operation, sending a connection request to the second electronic device, where the connection request establishes a connection to the second electronic device, receiving a connection confirmation message from the second electronic device, and sending the one or more shared files to the second electronic device.

20 Claims, 8 Drawing Sheets

(58) Field of Classification Search
CPC ..... H04L 12/1822; H04L 67/12; H04L 67/06; G06V 20/20
See application file for complete search history.

(56) References Cited

U.S. PATENT DOCUMENTS

| | | | | |
|---|---|---|---|---|
| 2014/0150023 | A1* | 5/2014 | Gudorf | H04N 21/4622 |
| | | | | 725/38 |
| 2014/0287806 | A1* | 9/2014 | Balachandreswaran | |
| | | | | A63F 13/285 |
| | | | | 463/7 |
| 2015/0229997 | A1* | 8/2015 | Park | H04N 21/41265 |
| | | | | 725/38 |
| 2017/0262247 | A1* | 9/2017 | Yoganandan | G06F 3/1462 |
| 2019/0114061 | A1 | 4/2019 | Daniels et al. | |
| 2019/0342738 | A1 | 11/2019 | Gao et al. | |
| 2021/0192853 | A1* | 6/2021 | Zalil | H04N 21/4122 |
| 2022/0150306 | A1* | 5/2022 | Kumar | G16Y 40/35 |
| 2022/0408136 | A1* | 12/2022 | Wang | H04N 21/439 |
| 2023/0188832 | A1* | 6/2023 | Xu | H04N 23/632 |
| | | | | 348/333.01 |
| 2023/0236714 | A1* | 7/2023 | Yang | H04M 1/72403 |
| | | | | 715/764 |
| 2024/0295945 | A1* | 9/2024 | Luo | G06F 3/0486 |
| 2024/0422209 | A1* | 12/2024 | Wang | H04L 67/131 |

FOREIGN PATENT DOCUMENTS

| | | | | |
|---|---|---|---|---|
| CN | 103257813 | B | * 12/2017 | ........... G06F 3/0488 |
| CN | 110221798 | A | 9/2019 | |
| CN | 110750197 | A | 2/2020 | |
| CN | 111107405 | A | * 5/2020 | |

* cited by examiner

CONTENT SHARING METHOD, ELECTRONIC DEVICE, AND STORAGE MEDIUM

CROSS-REFERENCE TO RELATED APPLICATIONS

This is a U.S. National Stage of International Patent Application No. PCT/CN2021/133869 filed on Nov. 29, 2021, which claims priority to Chinese Patent Application No. 202011411232.8 filed on Dec. 4, 2020. Both of the aforementioned applications are hereby incorporated by reference in their entireties.

TECHNICAL FIELD

Embodiments of this application relate to the field of communication technologies, and in particular, to a content sharing method, an electronic device, and a storage medium.

BACKGROUND

With rapid development of virtual reality technology, augmented reality (Augmented Reality, AR) and virtual reality (Virtual Reality, VR) have achieved remarkable results in games, news, film production, education, sports, and music. With the commercial use of 5G technologies, AR/VR products will become increasingly popular. Connection and collaboration between an AR/VR device and a reality device are inevitable. For example, when a user shares content on a virtual device like the AR/VR device with the reality device, the user cannot quickly select the reality device, and needs to perform complex operations, which reduces content sharing efficiency and user experience.

SUMMARY

Embodiments of this application provide a content sharing method, an electronic device, and a storage medium, to provide a manner of projecting content of a virtual device onto a reality device.

According to a first aspect, an embodiment of this application provides a content sharing method, applied to a first electronic device. The first electronic device displays a first image, the first image includes one or more shared files, and the method includes:

detecting a first operation performed by a user for content sharing, where specifically, the first operation may be that the user drags a shared file;

determining one or more shared files in response to the detected first operation, where specifically, the user may drag one shared file, or may drag a plurality of shared files at the same time;

detecting a second operation performed by the user for selecting a second electronic device, where specifically, the second operation may be that the user drags a shared file for a distance and then stops dragging the shared file, to trigger a process of selecting the second electronic device;

determining a second electronic device in response to the detected second operation, where specifically, the second electronic device may be automatically selected by the first electronic device, or may be manually selected by the user;

sending a connection request to the second electronic device, where the connection request is used to establish a connection to the second electronic device; and specifically, the connection may be a data transmission channel, and the data transmission channel may be used to transmit a shared file, to complete projection of the first electronic device onto the second electronic device; and receiving a connection confirmation message sent by the second electronic device, and sending the one or more shared files to the second electronic device.

In a possible implementation, a connection instruction is sent to one or more second electronic devices in response to the detected first operation, the connection instruction instructs the one or more second electronic devices to enable a connection portal, and the determining a second electronic device in response to the detected second operation includes:

identifying a connection portal of the second electronic device in response to the detected second operation, where specifically, the connection portal is used to identify an identity of the second electronic device; for example, the connection portal may be in a form of a two-dimensional code, or may be in another form, and this is not limited in embodiments of this application; and further, the second operation may be that the first electronic device turns on a camera to scan the two-dimensional code, and identifies the two-dimensional code, to initiate a connection to the second electronic device; and determining the second electronic device based on the identification result.

In a possible implementation, the determining a second electronic device in response to the detected second operation includes:

obtaining a second image in response to the detected second operation, where specifically, the second operation may be that the user drags the shared file for a distance and then stops dragging the shared file; and in this case, the first electronic device may obtain the second image by using the camera, and the second image may be an environmental image obtained by the camera;

identifying the second image, to obtain a target area, where specifically, the image identification may be performed by using a preset image identification model, and the target area may include an area of a target object;

determining whether a location of the shared file is in the target area, where specifically, after dragging the shared file to any location, the user may obtain coordinates of the location, and determine, based on the coordinates, whether the location of the shared file is in the target area; and if the location of the shared file is in the target area, identifying the target area, and determining a second electronic device in the target area.

In a possible implementation, the first electronic device includes a plurality of preset target areas, the preset target areas one-to-one correspond to second electronic devices, and the identifying the target area, and determining a second electronic device in the target area includes:

matching the target area with each preset target area, to obtain a preset target area that matches the target area, where specifically, the target area may be matched with each preset target area through image identification; and searching the preset target area, to determine a second electronic device corresponding to the preset target area.

In a possible implementation, the first electronic device includes preset positioning information of a plurality of second electronic devices, and the determining a second electronic device in response to the detected second operation includes:

obtaining a second image in response to the detected second operation, where specifically, the second operation may be that the user drags a shared file for a distance and then stops dragging the shared file; and in this case, the first electronic device may obtain the second image by using the camera, and the second image may be an environmental image obtained by the camera;

identifying the second image, to obtain a target area, where specifically, the image identification may be performed by using a preset image identification model, and the target area may include an area of a target object;

determining whether a location of the shared file is in the target area, where specifically, after dragging the shared file to any location, the user may obtain coordinates of the location, and determine, based on the coordinates, whether the location of the shared file is in the target area;

if the location of the shared file is in the target area, obtaining positioning information of the target object in the target area, where specifically, the positioning information may include a distance and a direction of the target object; and comparing the positioning information of the target object in the target area with preset positioning information of each second electronic device, and if the positioning information of the target object in the target area is consistent with positioning information of any second electronic device, determining that the target object is the second electronic device.

In a possible implementation, the positioning information of the second electronic device is determined based on ultrasonic preset audio transmitted by the second electronic device.

According to a second aspect, an embodiment of this application provides a content sharing apparatus, used in a first electronic device. The first electronic device displays a first image, the first image includes one or more shared files, and the apparatus includes:

a first determining module, configured to detect a first operation performed by a user for content sharing; and determine one or more shared files in response to the detected first operation;

a second determining module, configured to detect a second operation performed by the user for selecting a second electronic device; and determine a second electronic device in response to the detected second operation;

a connection module, configured to send a connection request to the second electronic device, where the connection request is used to establish a connection to the second electronic device; and a sending module, configured to receive a connection confirmation message sent by the second electronic device, and send the one or more shared files to the second electronic device.

In a possible implementation, the apparatus further includes:

an instruction module, configured to send a connection instruction to one or more second electronic devices, where the connection instruction instructs the one or more second electronic devices to enable a connection portal.

The second determining module is further configured to identify a connection portal of the second electronic device in response to the detected second operation; and determine the second electronic device based on an identification result.

In a possible implementation, the second determining module includes:

a first obtaining unit, configured to obtain a second image in response to the detected second operation, a first identification unit, configured to identify the second image, to obtain a target area;

a first judgment unit, configured to determine whether a location of the shared file is in the target area; and a first determining unit, configured to: if the location of the shared file is in the target area, identify the target area, and determine a second electronic device in the target area.

In a possible implementation, the first electronic device includes a plurality of preset target areas, and the preset target areas one-to-one correspond to second electronic devices. The first determining unit is further configured to match the target area with each preset target area, to obtain a preset target area that matches the target area; and search the preset target area, to determine a second electronic device corresponding to the preset target area.

In a possible implementation, the first electronic device includes preset positioning information of a plurality of second electronic devices, and the second determining module includes:

a second obtaining unit, configured to obtain a second image in response to the detected second operation;

a second identification unit, configured to identify the second image, to obtain a target area;

a second judgment unit, configured to determine whether a location of the shared file is in the target area; and a second determining unit, configured to: if the location of the shared file is in the target area, obtain positioning information of a target object in the target area; compare the positioning information of the target object in the target area with preset positioning information of each second electronic device; and if the positioning information of the target object in the target area is consistent with positioning information of any second electronic device, determine that the target object is the second electronic device.

In a possible implementation, the positioning information of the second electronic device is determined based on ultrasonic preset audio transmitted by the second electronic device.

According to a third aspect, an embodiment of this application provides a first electronic device. The first electronic device displays a first image, the first image includes one or more shared files, and the first electronic device includes:

a memory, where the memory is configured to store computer program code, the computer program code includes instructions, and when the first electronic device reads the instructions from the memory, the first electronic device is enabled to perform the following steps:

detecting a first operation performed by a user for content sharing;

determining one or more shared files in response to the detected first operation;

detecting a second operation performed by the user for selecting a second electronic device;

determining a second electronic device in response to the detected second operation;

sending a connection request to the second electronic device, where the connection request is used to establish a connection to the second electronic device; and receiving a connection confirmation message sent by the second electronic device, and sending the one or more shared files to the second electronic device.

In a possible implementation, a connection instruction is sent to one or more second electronic devices in response to the detected first operation, the connection instruction instructs the one or more second electronic devices to enable a connection portal, and when the instructions are executed by the first electronic device, that the first electronic device is enabled to perform the step of determining a second electronic device in response to the detected second operation includes:

identifying a connection portal of the second electronic device in response to the detected second operation; and determining the second electronic device based on the identification result.

In a possible implementation, when the instructions are executed by the first electronic device, that the first electronic device is enabled to perform the step of determining a second electronic device in response to the detected second operation includes:

obtaining a second image in response to the detected second operation;

identifying the second image, to obtain a target area;

determining whether a location of the shared file is in the target area; and if the location of the shared file is in the target area, identifying the target area, and determining a second electronic device in the target area.

In a possible implementation, the first electronic device includes a plurality of preset target areas, the preset target areas one-to-one correspond to second electronic devices, and when the instructions are executed by the first electronic device, that the first electronic device is enabled to perform the step of identifying the target area and determining a second electronic device in the target area includes:

matching the target area with the plurality of preset target areas, to obtain a preset target area that matches the target area; and searching the preset target area, to determine a second electronic device corresponding to the preset target area.

In a possible implementation, the first electronic device includes preset positioning information of a plurality of second electronic devices, and when the instructions are executed by the first electronic device, that the first electronic device is enabled to perform the step of determining a second electronic device in response to the detected second operation includes: obtaining a second image in response to the detected second operation;

identifying the second image, to obtain a target area;

determining whether a location of the shared file is in the target area;

if the location of the shared file is in the target area, obtaining positioning information of a target object in the target area; and comparing the positioning information of the target object in the target area with preset positioning information of the plurality of second electronic device, and if the positioning information of the target object in the target area is consistent with positioning information of any second electronic device, determining that the target object is the second electronic device.

In a possible implementation, the positioning information of the second electronic device is determined based on ultrasonic preset audio transmitted by the second electronic device.

According to a fourth aspect, an embodiment of this application provides a computer-readable storage medium. The computer-readable storage medium stores a computer program, and when the computer program is run on a computer, the computer is enabled to perform the method according to the first aspect.

According to a fifth aspect, an embodiment of this application provides a computer program. When the computer program is executed by a computer, the computer is configured to perform the method according to the first aspect.

In a possible design, all or some of the programs in the fifth aspect may be stored in a storage medium integrated with the processor, or some or all of the programs may be stored in a memory that is not integrated with the processor.

DESCRIPTION OF EMBODIMENTS

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise specified, "a plurality of" means two or more than two.

Currently, to share content on a virtual device like an AR/VR device with a reality device, a user needs to enter a reality device list page on the virtual device, and select a reality device with which the content is to be shared. This brings inconvenience to an operation of the user and reduces content sharing efficiency.

Based on the foregoing problem, embodiments of this application provide a content sharing method.

Figure 1:
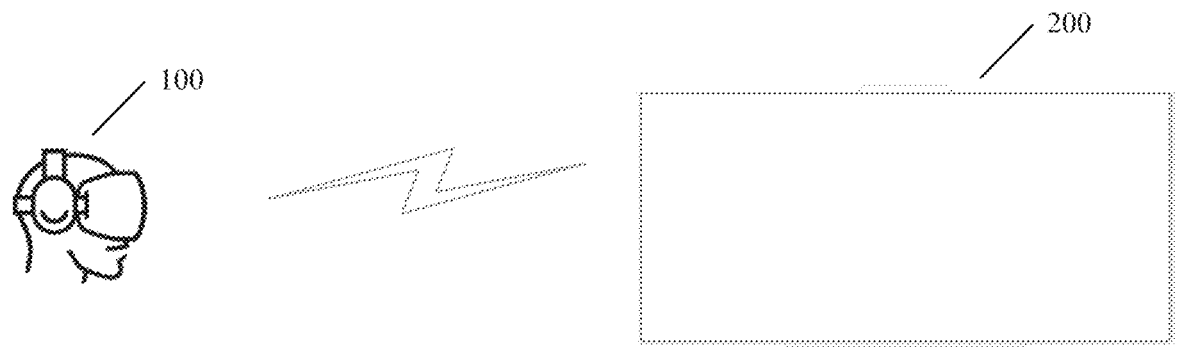
FIG. 1 is a schematic diagram of an application scenario of content sharing according to an embodiment of this application.

The content sharing method provided in embodiments of this application is described herein with reference to FIG. 1 to FIG. 10. FIG. 1 shows an application scenario provided in embodiments of this application. Refer to FIG. 1. The foregoing application scenario includes a virtual device 100 and a reality device 200.

The virtual device 100 may be electronic devices such as a VR head-mounted device and AR glasses. The reality device 200 may be an electronic device having a display, for example, electronic devices such as a television, a computer, a tablet computer, and a mobile phone.

Figure 2:
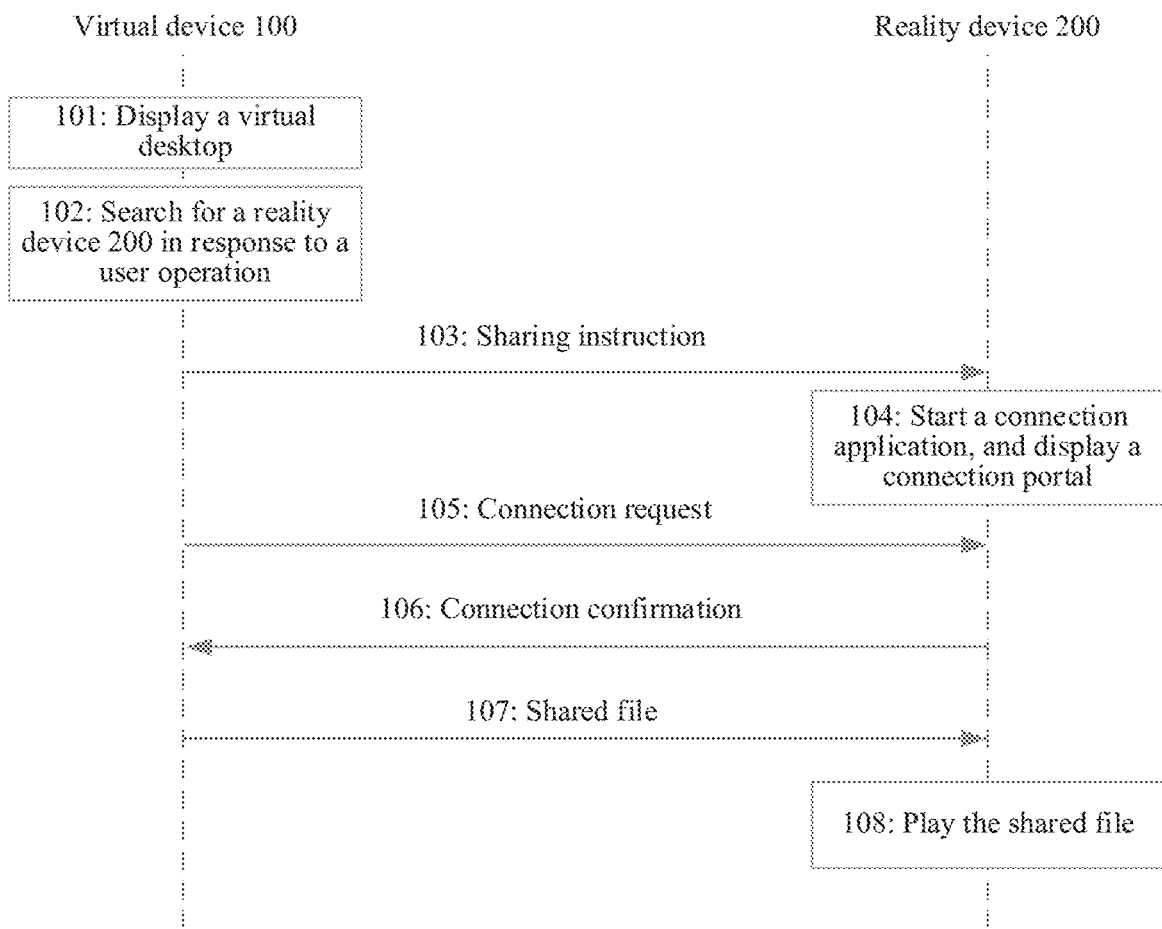
FIG. 2 is a schematic flowchart of an embodiment of a content sharing method according to this application.

FIG. 2 is a schematic flowchart of an embodiment of a content sharing method according to an embodiment of this application. The method includes the following steps.

Step 101: A virtual device 100 displays a virtual desktop.

Specifically, the virtual desktop may include one or more files, and types of the files may include picture, video, audio, text, and the like. This is not specifically limited in embodiments of this application.

Figure 3:
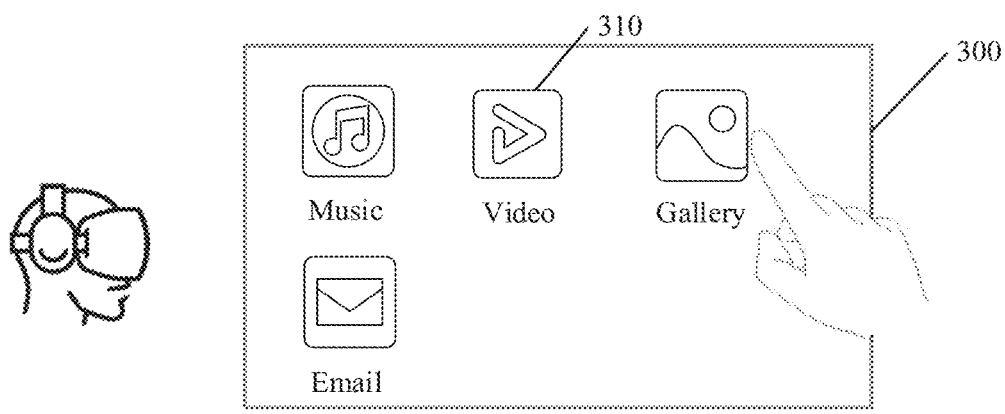
FIG. 3 is a schematic diagram of a virtual desktop according to an embodiment of this application.

FIG. 3 is a schematic diagram of an effect of a virtual desktop. As shown in FIG. 3, a virtual desktop 300 may include various types of files 310. A user may perform an operation like tapping or dragging on the file 310 on the virtual desktop 300.

Step 102: Detect an operation of dragging a desktop file by the user, and search for a nearby reality device 200 in response to the operation.

Specifically, the user may perform an operation on the desktop file on the virtual desktop 300 of the virtual device 100, to start sharing of the desktop file. For example, the user may drag any file on the virtual desktop 300 for a distance and then release the file. In response to the operation of dragging the file by the user, the virtual device 100 starts searching for a nearby reality device 200. The searching manner may be scanning via a local area network. For example, the local area network may be one or a combination of a bus type, a ring type, a star type, and a tree type. The virtual device 100 and the reality device 200 may be located in a same local area network. Therefore, the virtual device 100 and the reality device 200 in the same local area network may discover each other. In addition, the local area network may be networked through Wi-Fi, or may be networked through self-networking (for example, Bluetooth or a hotspot) between devices. This is not limited in embodiments of this application. It may be understood that the operation may also be an operation in another form. This is not specifically limited in embodiments of this application.

Optionally, the user may further drag and release a plurality of files, to trigger sharing of the files. This is not specifically limited in embodiments of this application.

Figure 4:
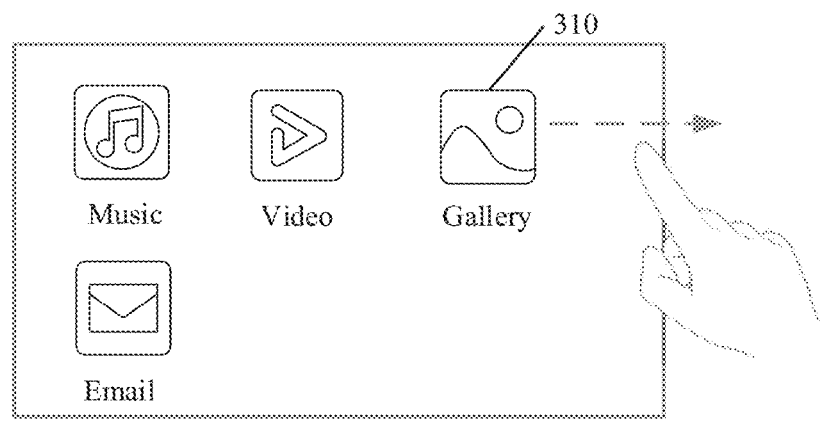
FIG. 4 is a schematic diagram of operating a shared file by a user according to an embodiment of this application.

FIG. 4 is a schematic diagram of an operation of dragging a file by a user. As shown in FIG. 4, the user may drag a file 310 and then release the file 310, for example, drag the file 310 out of a virtual desktop 300 and then release the file 310.

Step 103: If one or more reality devices 200 are found, send a sharing instruction to the one or more reality devices 200.

Specifically, after searching for the nearby reality device 200, the virtual device 100 may send the sharing instruction to the one or more reality devices 200 if the one or more reality devices 200 are found. The sharing instruction instructs the reality device 200 to start a connection application.

Step 104: The reality device 200 receives the sharing instruction sent by the virtual device 100, and starts the connection application.

Specifically, after receiving the sharing instruction sent by the virtual device 100, the reality device 200 may start the corresponding connection application. The connection application program may be used to establish a connection between the virtual device 100 and the reality device 200. For example, after the reality device 200 starts the connection application, a connection portal may be displayed on a display interface of the reality device 200. The connection portal identifies a portal for establishing a connection. During specific implementation, the connection portal may be in a form of a two-dimensional code, or may be in another form. This is not specifically limited in embodiments of this application.

Step 105: Detect an operation of scanning a two-dimensional code on the display interface of the reality device 200 by the user by using a camera of the virtual device 100. The virtual device 100 initiates a connection request to the reality device 200 in response to the operation.

Specifically, the user may perform an operation on the virtual device 100, to initiate a connection to the reality device 200. For example, the user may turn on the camera of the virtual device 100, to scan the two-dimensional code on the display interface of the reality device 200. The virtual device 100 initiates the connection request to the reality device 200 in response to the operation. The connection request requests to establish a connection to the reality device 200, the connection request may carry a device number of the virtual device 100, and the device number may identify an identity of the virtual device 100.

Step 106: The reality device 200 receives the connection request sent by the virtual device 100, establishes a connection to the virtual device 100, and sends a connection confirmation message to the virtual device 100.

Specifically, after receiving the connection request from the virtual device 100, the reality device 200 may establish a connection to the virtual device 100. The connection may transmit shared content between the virtual device 100 and the reality device 200. The shared content may include file content such as a picture, a video, audio, and a text.

Step 107: The virtual device 100 receives the connection confirmation message sent by the reality device 200, and sends the shared content to the reality device 200.

Specifically, after receiving the connection confirmation message sent by the reality device 200, the virtual device 100 may send the shared content to the reality device 200. The shared content may be the file dragged by the user in step 102.

Step 108: The reality device 200 receives the shared content sent by the virtual device 100, and plays the shared content on a display, to complete content sharing.

Specifically, after receiving the shared content sent by the virtual device 100, the reality device 200 may play the shared content on the display, to complete content sharing.

It may be understood that, if the reality device 200 receives a plurality of files sent by the virtual device 100, the reality device 200 may play the plurality of files in sequence. The playing sequence may be random playing, or may be playing in a receiving sequence. This is not specifically limited in embodiments of this application.

In this embodiment, a drag operation performed by the user on the virtual device triggers a connection to the reality device, and the user scans the connection application of the reality device by using the camera, so that the virtual device establishes a connection to the reality device, to implement content sharing between the virtual device and the reality device, improve content sharing efficiency, facilitate a user operation, and improve user operation experience.

Figure 5:
FIG. 5 is a schematic flowchart of another embodiment of a content sharing method according to this application.

FIG. 5 is a schematic flowchart of another embodiment of a content sharing method according to an embodiment of this application. The method includes the following steps.

Step 201: A virtual device 100 obtains a real-time image, and identifies the real-time image.

Specifically, a user may perform an operation on the virtual device 100, to obtain the real-time image. For example, the user may turn on a camera of the virtual device 100, and the virtual device 100 may obtain the real-time image in response to the operation of the user. Then, the virtual device 100 may identify the real-time image obtained by the camera, and determine whether the current image includes a reality device 200.

Step 202: The virtual device 100 obtains a target area of the reality device 200.

Specifically, if the virtual device 100 identifies that the reality device 200 exists in the current image, the virtual device 100 may obtain the target area corresponding to the reality device 200. The target area may identify an area in which the reality device 200 is located, and the target area includes an area size and an image corresponding to the area. During specific implementation, a screenshot of the current image may be taken to obtain the target area, and the target area includes the identified reality device 200. Preferably, the reality device 200 may be located at a central location of the target area, or may be located at another location of the target area. This is not specifically limited in embodiments of this application.

It may be understood that a size of the target area may be preset. Because a television product is a product with a large size in reality devices, the size of the target area may be set based on a maximum size of a television product. For example, the size of the target area may be set to be greater than the maximum size of the television product.

Figure 6:
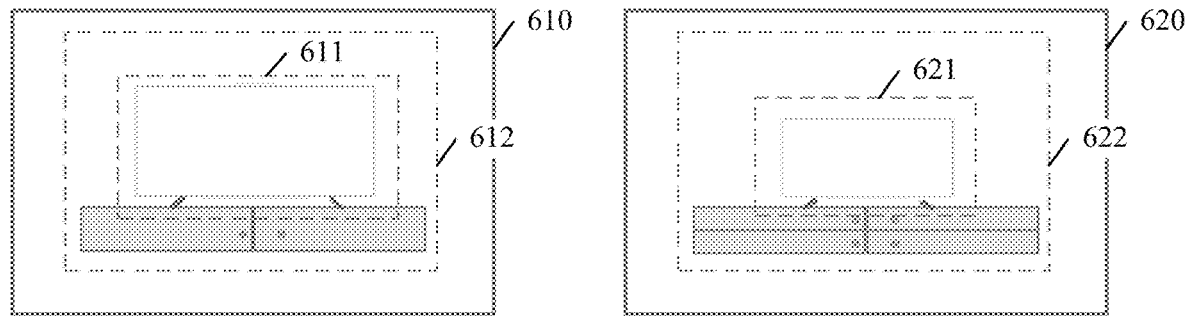
FIG. 6 is a schematic diagram of an embodiment of determining a target area according to this application.

Description is now provided with reference to FIG. 6. As shown in FIG. 6, the virtual device 100 separately obtains an image 610 and an image 620 by using the camera, and determines, by identifying the image 610 and the image 620, that a reality device 200 exists in a first area 611 and a second area 621. The first area 611 is greater than the second area 621. In this case, a first target area 612 of the reality device 200 in the first area 611 and a second target area 622 of the reality device 200 in the second area 621 may be separately determined based on the preset size A size of the first target area 612 is equal to a size of the second target area 622.

Optionally, the size of the target area may alternatively be dynamically set. Because sizes of the reality device 200 identified for a plurality of times are not necessarily the same, the size of the target area may be determined based on the size of the reality device 200 identified each time. For example, after identifying the reality device 200, the virtual device 100 may obtain an area of the reality device 200, and then add a preset area to the area of the reality device 200 to obtain the target area. The preset area may be an annular area of a preset width.

Figure 7:
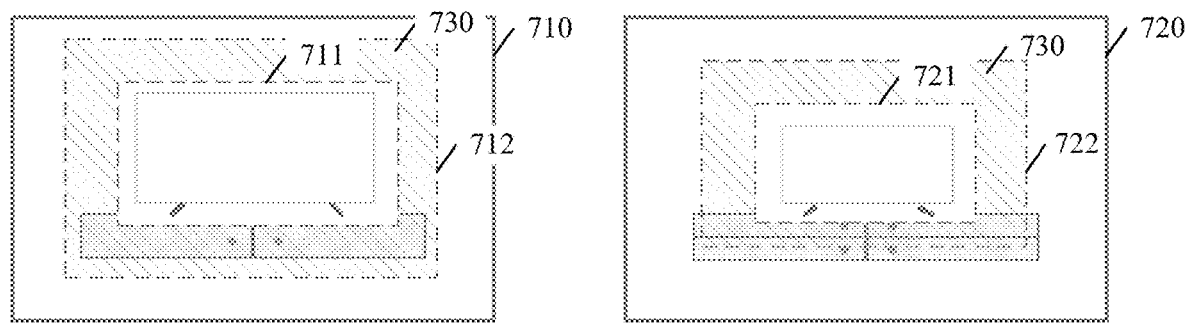
FIG. 7 is a schematic diagram of another embodiment of determining a target area according to this application.

Description is now provided with reference to FIG. 7. As shown in FIG. 7, the virtual device 100 separately obtains an image 710 and an image 720 by using the camera, and determines, by identifying the image 710 and the image 720, that a reality device 200 exists in a first area 711 and a second area 721. The first area 711 is greater than the second area 721. In this case, a preset area 730 may be added outside the first area 711, so that a first target area 712 can be obtained; and a preset area 730 is added outside the second area 721, so that a second target area 722 can be obtained. The first target area 712 is greater than the second target area 722.

Step 203: The virtual device 100 obtains a list of reality devices 200.

Specifically, after obtaining the target area of the reality device 200, the virtual device 100 may further identify an identity of the reality device 200. During specific implementation, the virtual device 100 may obtain a list of reality devices 200 in a same local area network, and may display the list on a display interface of the virtual device 100 for selecting by the user. A manner of obtaining the list of the reality devices 200 may be a manner of searching for the reality devices by using the virtual device 100 in the same local area network. For the manner of finding the reality device 200 by the virtual device 100, refer to step 102. Details are not described herein again. The list may include information about one or more reality devices 200, and the information about the reality device 200 may include a device number of the reality device 200. The device number identifies an identity of the reality device 200, so that the virtual device 100 establishes a connection to the reality device 200.

Figure 8:
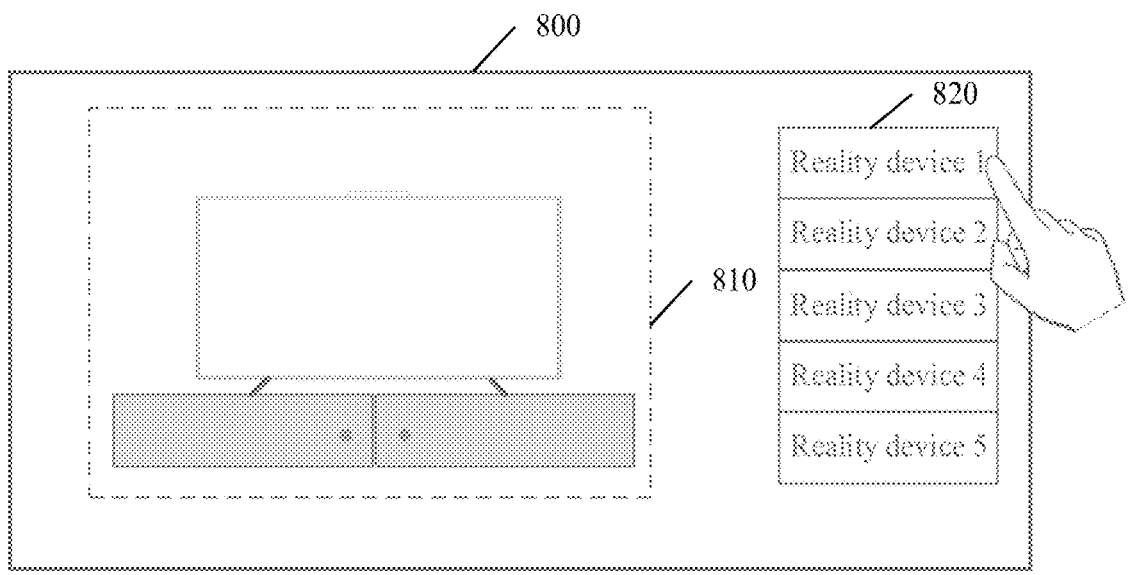
FIG. 8 is a schematic diagram of an interface for binding a target area to a reality device according to an embodiment of this application.

FIG. 8 is a reality device list selection interface 800. As shown in FIG. 8, the interface 800 includes a target area 810 and a list 820. The target area 810 identifies an area in which a reality device 200 is located, and the list 820 includes options of one or more local reality devices 200.

Step 204: Detect an operation of selecting a reality device 200 by the user, and in response to the operation, the virtual device 100 binds the reality device 200 selected by the user to the target area.

Specifically, the user may perform an operation on the display interface of the virtual device 100, to select the reality device 200. For example, the user may tap an option of any reality device 200 in the foregoing list, to select the reality device 200. In response to the operation of the user, the virtual device 100 determines the reality device 200, obtains information about the reality device 200, binds the information about the reality device 200 to the target area and stores the information. Therefore, a mapping table shown in Table 1 between the target area and the reality device 200 can be obtained. The mapping table may include a mapping relationship between each reality device 200 and a target area. The target area may identify a scenario. For example, the scenario may be a living room or a bedroom lamp.

TABLE 1

| Scenario | Reality device 200 |
| --- | --- |
| Target area 1 | Device 1 |
| Target area 2 | Device 2 |
| Target area 3 | Device 3 |

Step 205: The virtual device 100 displays a virtual desktop.

Step 206: Detect an operation of dragging a desktop file by the user, and obtain an image in real time in response to the operation.

Specifically, the user may perform an operation on the desktop file on the virtual desktop 300 of the virtual device 100, to start sharing of the desktop file. For example, the user may drag one or more files on the virtual desktop 300, and the virtual device 100 may turn on the camera in response to the operation of dragging the one or more files by the user, to obtain an image in real time by using the camera.

Step 207: The virtual device 100 obtains a current image, and identifies a target area in the image.

Specifically, the user may drag the file and then stop dragging the file, and the file may stay at a current location. The virtual device may obtain the current image, and obtain information about the current location of the file. For example, the location information may include coordinates of the file in the current image. Then, the virtual device 100 may further identify the target area in the current image. For a process of identifying the target area, refer to step 202. Details are not described herein again. In addition, a coordinate range of the target area in the current image may be obtained.

Step 208: The virtual device 100 determines whether the current location of the file is in the target area.

Specifically, after obtaining the current location of the file and the target area, the virtual device 100 may determine whether the current location of the file is in the target area. For example, in the current image, the current image may be used as a reference system, and a coordinate system is established. Therefore, the coordinates of the file and the coordinate range of the target area are coordinates in the current image. Whether the coordinates of the file are within the coordinate range of the target area is determined, to determine whether the current location of the file is in the target area.

Figure 9:
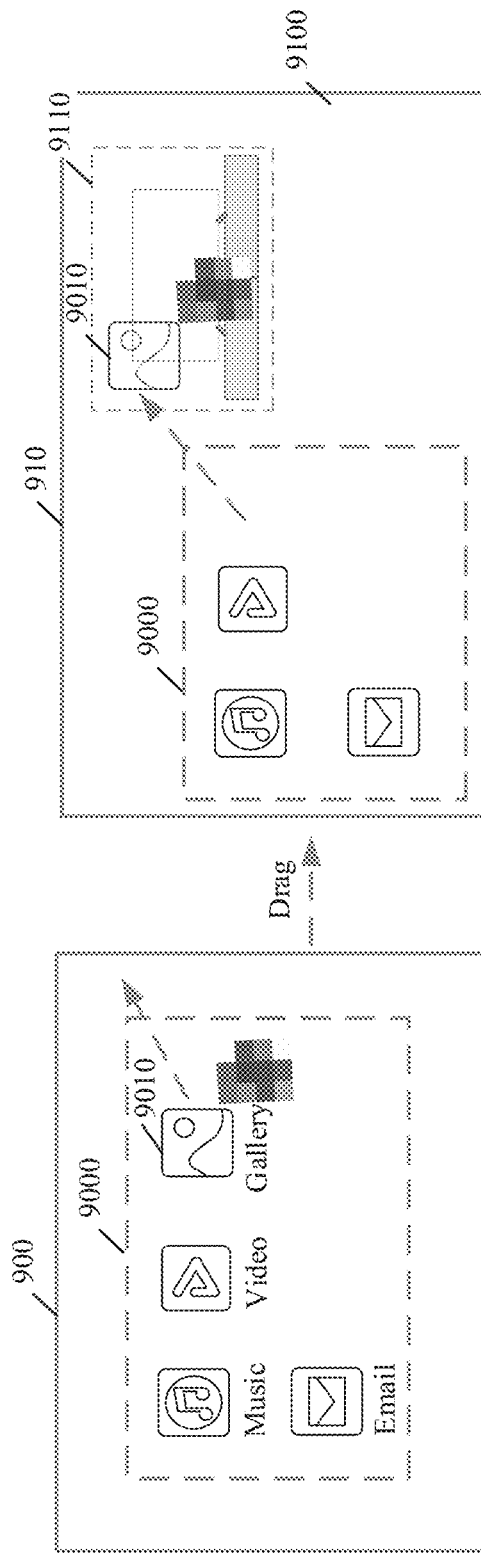
FIG. 9 is a schematic diagram of determining locations of a shared file and a target area according to an embodiment of this application.

Description is now provided with reference to FIG. 9. As shown in FIG. 9, the virtual device 100 displays an interface 900. The interface 900 is configured to display a desktop 9000, and the desktop includes a file 9010. The user drags the file 9010 to enable the virtual device 100 to turn on the camera, so as to obtain an interface 910. The interface 910 includes the desktop 9000 and a real-environment image 9100. The real-environment image 9100 includes a target area 9110. After the user stops dragging the file 9010, the virtual device 100 determines whether a location of the file 9010 is in the target area 9110. For example, the virtual device 100 may obtain coordinates of the file 9010 in the real-environment image 9100 and coordinates of the target area 9110 in the real-environment image 9100, and may determine, based on the coordinates, whether the file 9010 is located in the target area.

Step 209: The virtual device 100 compares the currently identified target area with the target areas prestored in the mapping table, and finds, in the mapping table, a target area consistent with the current target area.

Specifically, if the current location of the file is in the current target area, the current target area may be compared with all target areas in the mapping table prestored in step 204. The comparison manner may be image comparison, to determine a target area, in the mapping table, that is consistent with a scenario of the current target area. It may be understood that the comparison may be performed in another manner. This is not limited in embodiments of this application.

Step 210: The virtual device 100 obtains a reality device 200 in the target area based on the mapping relationship.

Specifically, after determining the target area the virtual device 100 may obtain information about the reality device 200 corresponding to the target area by searching based on the mapping relationship in the mapping table. For example, a device number of the reality device 200 corresponding to the determined target area may be obtained.

Step 211: The virtual device 100 sends a connection request to the reality device 200 based on the information about the reality device 200.

Step 212: The reality device 200 receives the connection request sent by the virtual device 100, establishes a connection to the virtual device, and sends a connection confirmation message to the virtual device 100.

Specifically, after receiving the connection request from the virtual device 100, the reality device 200 may establish a connection to the virtual device 100. The connection may transmit shared content between the virtual device 100 and the reality device 200. The shared content may include file content such as a picture, a video, audio, and a text.

Step 213: The virtual device 100 receives the connection confirmation message sent by the reality device 200, and sends the shared content to the reality device 200.

Specifically, after receiving the connection confirmation message sent by the reality device 200, the virtual device 100 may send the shared content to the reality device 200. The shared content may be the file dragged by the user in step 206.

Step 214: The reality device 200 receives the shared content sent by the virtual device 100, and plays the shared content on a display, to complete content sharing.

Specifically, after receiving the shared content sent by the virtual device 100, the reality device 200 may play the shared content on the display, to complete content sharing. It may be understood that, if the reality device 200 receives a plurality of files sent by the virtual device 100, the reality device 200 may play the plurality of files in sequence. The playing sequence may be random playing, or may be playing in a receiving sequence. This is not specifically limited in embodiments of this application.

In this embodiment, a scenario is bound to a reality device in advance. When dragging a file to a target location, the user finds a reality device by identifying a real scenario, so that a connection can be established between the virtual device and the reality device, to implement content sharing between the virtual device and the reality device, improve content sharing efficiency, facilitate a user operation, and improve user operation experience.

Figure 10:
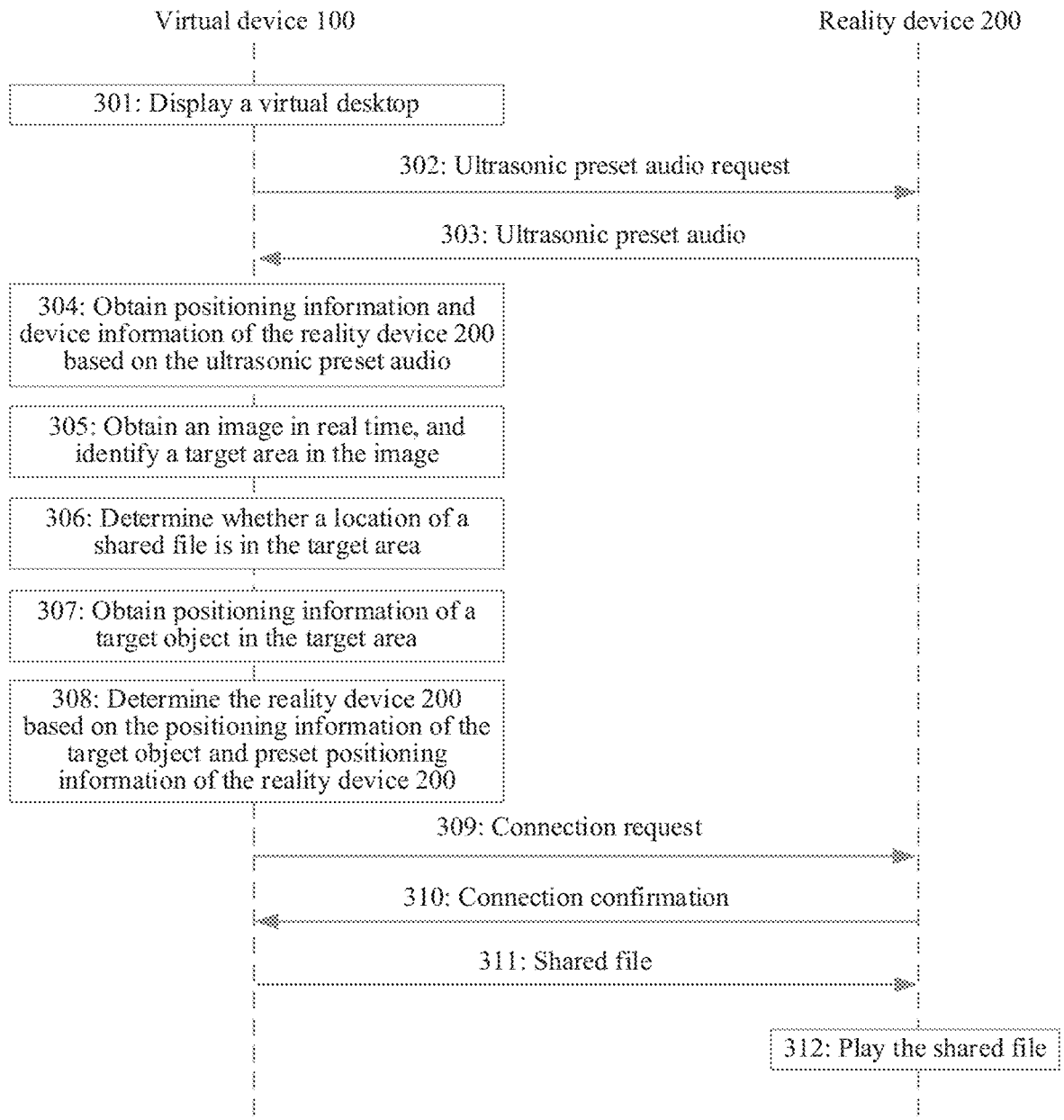
FIG. 10 is a schematic flowchart of still another embodiment of a content sharing method according to this application.

FIG. 10 is a schematic flowchart of still another embodiment of a content sharing method according to an embodiment of this application. The method includes the following steps.

Step 301: A virtual device 100 displays a virtual desktop.

Step 302: Detect an operation of dragging a desktop file by a user, and in response to the operation, the virtual device 100 turns on a time of flight (Time-of-Flight, TOF) camera, obtains an image in real time, and sends an ultrasonic preset audio request to one or more reality devices 200.

Specifically, the user may perform an operation on the desktop file on the virtual desktop 300 of the virtual device 100, to start sharing of the desktop file. For example, the user may drag any file on the virtual desktop 300. In response to the operation of dragging the file by the user, the virtual device 100 turns on the time of flight (Time-of-Flight. TOF) camera, obtains the image in real time, and sends the ultrasonic preset audio request to the one or more reality devices 200. The ultrasonic preset audio request requests the reality device 200 to send ultrasonic preset audio. The ultrasonic preset audio may be an ultrasonic wave. By using the ultrasonic wave, the virtual device 100 may determine a distance between the reality device 200 and the virtual device 100 and a direction.

Step 303: The reality device 200 receives the ultrasonic preset audio request sent by the virtual device 100, and transmits the ultrasonic preset audio to the virtual device 100.

Specifically, the ultrasonic preset audio may be a preset ultrasonic wave, for example, may be an ultrasonic wave of a preset frequency and a preset wave band. It may be understood that the ultrasonic preset audio may be generated in advance, or may be generated in real time according to the ultrasonic preset audio request. This is not limited in embodiments of this application. In addition, the ultrasonic preset audio may further include device information (for example, an IP address of the reality device 200) of the reality device 200. The device information is used to determine a network address of the reality device 200, so that the virtual device 100 can initiate a connection to the reality device 200. It may be understood that the foregoing merely uses an example to describe determining the network address of the reality device 200 by using the IP address, or the network address of the reality device 200 may be determined in another manner. This is not specifically limited in embodiments of this application.

Step 304: The virtual device 100 receives ultrasonic preset audio transmitted by the one or more reality devices 200, and obtains positioning information and device information of each reality device 200 based on the ultrasonic preset audio.

Specifically, after receiving the ultrasonic preset audio transmitted by the one or more reality devices 200, the virtual device 100 may identify a direction and a distance of the ultrasonic preset audio by using a multi-array microphone, to obtain the positioning information of each reality device 200. The positioning information may include a distance and a direction. The virtual device 100 may obtain device information of the reality device 200 based on the ultrasonic preset audio. The device information corresponds to the distance and the direction.

Further, the virtual device 100 may further store the distance, the direction, and the device information of each reality device 200, to obtain Table 2.

TABLE 2

| Device information of the reality device 200 | Positioning information of the reality device 200 |
|---|---|
| Device 1 (IP address 1) | Distance, direction |
| Device 2 (IP address 2) | Distance, direction |
| Device 3 (IP address 3) | Distance, direction |

Step 305: The virtual device 100 obtains a current image, and identifies a target area in the image.

Specifically, the user may drag the file and then stop dragging the file, and the file may stay at a current location. The virtual device may obtain the current image by using the TOF camera, and obtain information about the current location of the file. For example, the location information may include coordinates of the file in the current image. Then, the virtual device 100 may further identify the target area in the current image. For a process of identifying the target area refer to step 202. Details are not described herein again. In addition, a coordinate range of the target area in the current image may be obtained.

Step 306: The virtual device 100 determines whether the current location of the file is in the target area.

Specifically, after obtaining the current location of the file and the target area, the virtual device 100 may determine whether the current location of the file is in the target area. For example, in the current image, the current image may be used as a reference system, and a coordinate system is established. Therefore, the coordinates of the file and the coordinate range of the target area are coordinates in the current image. Whether the coordinates of the file are within the coordinate range of the target area is determined, to determine whether the current location of the file is in the target area.

Step 307: The virtual device 100 obtains a distance and a direction of a target object in the target area.

Specifically, if the current location of the file is in the target area, the virtual device 100 may further obtain the distance and the direction of the target object in the target area. During specific implementation, the virtual device 200 may further position the target object in the target area by using the TOF camera, to obtain the distance and the direction of the target object.

Step 308: The virtual device 100 matches a distance and a direction of each reality device 200 obtained by using the ultrasonic preset audio in step 304 with the distance and the direction of the target object obtained by using the TOF camera, and if the two are consistent, determines that the target object is the reality device 200, and obtains information about the reality device 200.

Specifically, after obtaining the distance and the direction of the target object measured by the TOF camera, the virtual device 100 may match the distance and the direction of each reality device 200 obtained by using the ultrasonic preset audio with the distance and the direction obtained by using the TOF camera. If a distance and a direction of any reality device 200 obtained by using the ultrasonic preset audio are consistent with the distance and the direction obtained by using the TOF camera, it may be considered that the reality device 200 exists in terms of the distance and the direction. In this way, the virtual device 100 may obtain the information about the corresponding reality device 200 by searching based on the distance and the direction. For example, the virtual device 100 may obtain the information about the reality device 200 by searching based on the distance, the direction, and the device information stored in step 304, so that the reality device 200 can be determined.

Step 309. The virtual device 100 sends a connection request to the reality device 200 based on the device information.

Step 310: The reality device 200 receives the connection request sent by the virtual device 100, establishes a connection to the virtual device, and sends a connection confirmation message to the virtual device 100.

Specifically, after receiving the connection request from the virtual device 100, the reality device 200 may establish a connection to the virtual device 100. The connection may transmit shared content between the virtual device 100 and the reality device 200. The shared content may include file content such as a picture, a video, audio, and a text.

Step 311: The virtual device 100 receives the connection confirmation message sent by the reality device 200, and sends the shared content to the reality device 200.

Specifically, after receiving the connection confirmation message sent by the reality device 200, the virtual device 100 may send the shared content to the reality device 200. The shared content may be the file dragged by the user in step 302.

Step 312: The reality device 200 receives the shared content sent by the virtual device 100, and plays the shared content on a display, to complete content sharing.

Specifically, after receiving the shared content sent by the virtual device 100, the reality device 200 may play the shared content on the display, to complete content sharing.

In this embodiment, a distance, a direction, and device information of a reality device are obtained by sending ultrasonic preset audio by the reality device, and a distance, a direction, and device information of a reality device are obtained by using a TOF camera. The foregoing two distances and two directions are compared to determine the reality device, and a connection is established to the reality device. This facilitates a user operation, improves content sharing efficiency, and improves user operation experience.

It should be noted that this embodiment of this application shows only a scenario in which the virtual device sends a file to one reality device for sharing, but does not exclude a case in which the virtual device sends a file to a plurality of reality devices for sharing. A process in which the virtual device sends a file to a plurality of reality devices is similar to a process in which the virtual device sends a file to one reality device. For details, refer to the foregoing embodiments. Details are not described herein again.

Figure 11:
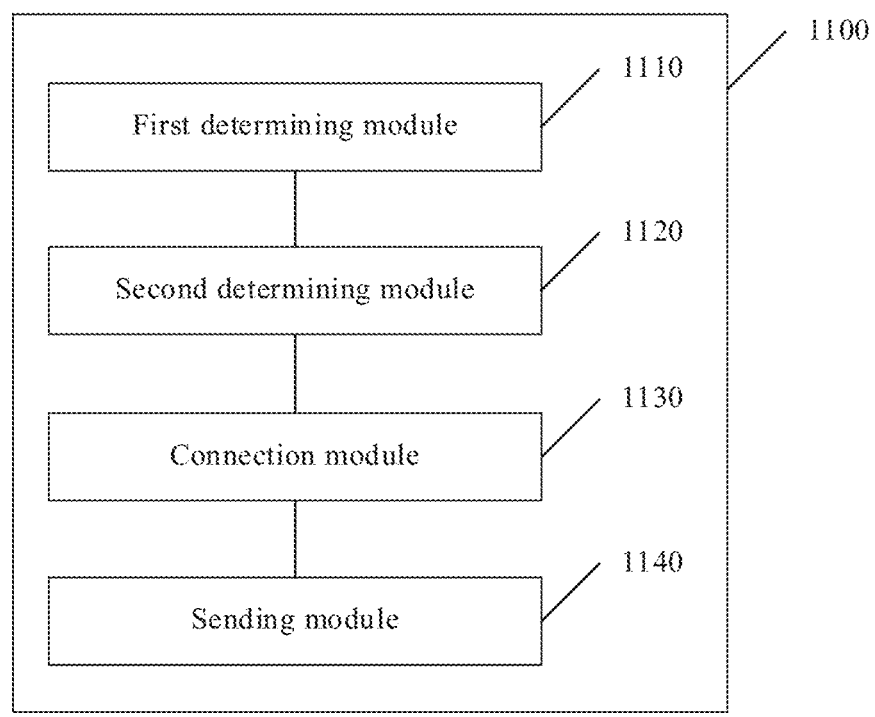
FIG. 11 is a schematic diagram of a structure of a content sharing apparatus according to an embodiment of this application.

FIG. 11 is a schematic diagram of a structure of an embodiment of a content sharing apparatus according to this application. As shown in FIG. 11, the content sharing apparatus 1100 may include a first determining module 1110, a second determining module 1120, a connection module 1130, and a sending module 1140.

The first determining module 1110 is configured to detect a first operation performed by a user for content sharing; and determine one or more shared files in response to the detected first operation.

The second determining module 1120 is configured to detect a second operation performed by the user for selecting a second electronic device; and determine a second electronic device in response to the detected second operation.

The connection module 1130 is configured to send a connection request to the second electronic device, where the connection request is used to establish a connection to the second electronic device.

The sending module 1140 is configured to receive a connection confirmation message sent by the second electronic device, and send the one or more shared files to the second electronic device.

In a possible implementation, the apparatus 1100 may further include an instruction module 1150.

The instruction module 1150 is configured to send a connection instruction to one or more second electronic devices, where the connection instruction instructs the one or more second electronic devices to enable a connection portal.

The second determining module 1120 is further configured to identify a connection portal of the second electronic device in response to the detected second operation; and determine the second electronic device based on an identification result.

In a possible implementation, the second determining module 1120 includes: a first obtaining unit 1121, a first identification unit 1122, a first judgment unit 1123, and a first determining unit 1124.

The first obtaining unit 1121 is configured to obtain a second image in response to the detected second operation.

The first identification unit 1122 is configured to identify the second image, to obtain a target area.

The first judgment unit 1123 is configured to determine whether a location of the shared file is in the target area.

The first determining unit 1024 is configured to: if the location of the shared file is in the target area, identify the target area, and determine a second electronic device in the target area.

In a possible implementation, the first electronic device includes a plurality of preset target areas, and the preset target areas one-to-one correspond to second electronic devices. The first determining unit 1124 is further configured to match the target area with each preset target area, to obtain a preset target area that matches the target area; and search the preset target area, to determine a second electronic device corresponding to the preset target area.

In a possible implementation, the first electronic device includes preset positioning information of a plurality of second electronic devices, and the second determining module 1120 includes:

a second obtaining unit 1125, configured to obtain a second image in response to the detected second operation;

a second identification unit 1126, configured to identify the second image, to obtain a target area;

a second judgment unit 1127, configured to determine whether a location of the shared file is in the target area; and a second determining unit 1128, configured to: if the location of the shared file is in the target area, obtain positioning information of a target object in the target area: compare the positioning information of the target object in the target area with preset positioning information of each second electronic device; and if the positioning information of the target object in the target area is consistent with positioning information of any second electronic device, determine that the target object is the second electronic device.

In a possible implementation, the positioning information of the second electronic device is determined based on ultrasonic preset audio transmitted by the second electronic device.

It should be understood that division into the modules of the content sharing apparatus shown in FIG. 11 is merely division of logical functions. In actual implementation, all or some of the modules may be integrated into one physical entity, or may be physically separated. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, a detection module may be a separately disposed processing element, or may be integrated into a chip of an electronic device for implementation. Implementations of other modules are similar to the implementation of the detection module. In addition, all or some of the modules may be integrated together, or may be implemented independently. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (Application-Specific Integrated Circuit, ASIC for short below), one or more digital signal processors (Digital Signal Processor, DSP for short below), or one or more field programmable gate arrays (Field Programmable Gate Array, FPGA for short below). For another example, the modules may be integrated together, and implemented in a form of a system-on-a-chip (System-On-a-Chip, SOC for short below).

Figure 12:
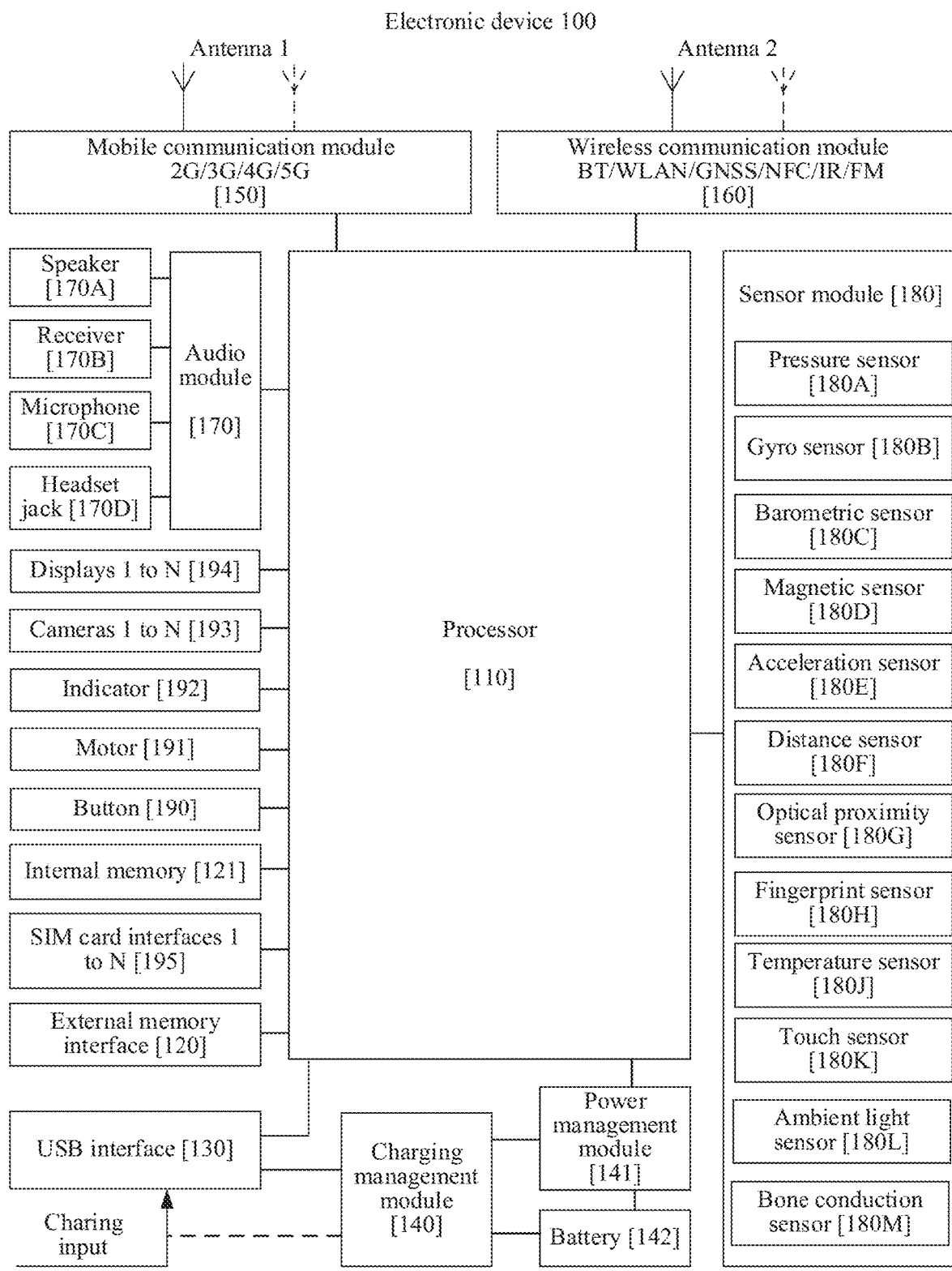
FIG. 12 is a schematic diagram of a structure of an electronic device according to an embodiment of this application.

FIG. 12 is a schematic diagram of a structure of an electronic device 100. The electronic device 100 may be the foregoing virtual device 100.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that is just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus. USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral component like the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be used to transfer data between the electronic device 100 and a peripheral device, or may be configured to connect to a headset for playing audio by using the headset. The interface may be further configured to connect to another electronic device like an AR device.

It may be understood that interface connection relationships between the modules shown in embodiments of the present invention are merely an example for description, and constitute no limitation on the structure of the electronic device 100. In some other embodiments of this application, the electronic device 100 may alternatively use an interface connection manner different from that in the foregoing embodiments, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 100 and that includes a wireless local area network (wireless local area network, WLAN) (like a wireless fidelity (wireless fidelity. Wi-Fi) network). Bluetooth (Bluetooth, BT), a global navigation satellite system (global navigation satellite system GNSS), frequency modulation (frequency modulation, FM), a near field communication (near field communication. NFC) near field communication, and an infrared (infrared, IR) technology. The wireless communication module 160 may be one or more components integrating at least one communication processor module. The wireless communication module 160 receives an electromagnetic wave through the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system. QZSS), and/or a satellite based augmentation system (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function by using the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in various encoding formats, such as moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented by the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application (for example, a sound playing function or an image playing function) required by at least one function, and the like. The data storage area may store data (such as audio data and a phone book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode by using the speaker 170A.

The receiver 170B, also referred to as an "earpiece", is configured to convert an electrical audio signal into a sound signal. When a call is answered or audio information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages application icon, an instruction to view an SMS message is performed. When a touch operation whose touch operation intensity is greater than or equal to the first pressure threshold is performed on the Messages application icon, an instruction to create a new SMS message is performed.

The gyro sensor 180B may be configured to determine a motion gesture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a flip phone, the electronic device 100 may detect opening and closing of a flip cover based on the magnetic sensor 180D. Further, a feature like automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application like switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may further be compatible with an external memory card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

It may be understood that interface connection relationships between the modules illustrated in embodiments of this application are merely an example for description, and constitute no limitation on the structure of the electronic device 100. In some other embodiments of this application, the electronic device 100 may alternatively use an interface connection manner different from that in the foregoing embodiments, or use a combination of a plurality of interface connection manners.

It can be understood that, to implement the foregoing functions, the electronic device and the like each include corresponding hardware structures and/or software modules for performing the foregoing functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions A person skilled in the art may use different methods to implement the described functions for each particular application, but it should not be considered that the implementation goes beyond the scope of embodiments of this application.

Function modules may be obtained by dividing the foregoing electronic device and the like based on the foregoing method examples in embodiments of this application. For example, the function modules may be obtained through division for corresponding functions, or two or more functions may be integrated into one processing module. The integrated module may be implemented in a form of hardware, or may be implemented in a form of a software functional module. It should be noted that, in embodiments of this application, division into modules is an example, and is merely a logical function division. In actual implementation, another division manner may be used.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, or a network device) or processor to perform all or some of the steps of the methods described in embodiments of this application. The foregoing storage medium includes any medium that can store program code, like a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first electronic device, wherein the method comprises:
   displaying a first image comprising one or more shared files;
   detecting, from a user, a first operation for content sharing;
   determining the one or more shared files in response to the first operation;
   detecting, from the user, a second operation selecting a second electronic device;
   obtaining, in response to the second operation, a second image;
   identifying the second image to obtain a target area;
   obtaining positioning information of a target object in the target area when a location of the one or more shared files is in the target area;
   comparing the positioning information with preset positioning information of a second electronic device, wherein the preset positioning information resides in the first electronic device;
   identifying the target object as the second electronic device when the positioning information is consistent with preset positioning information of the second electronic device;
   sending, to the second electronic device, a connection request to establish a connection to the second electronic device;
   receiving, from the second electronic device, a connection confirmation message; and
   sending, to the second electronic device using the connection, the one or more shared files.

2. The method of claim 1, further comprising:
   sending, to the second electronic device in response to the first operation, a connection instruction configured to instruct the second electronic device to enable a connection portal of the second electronic device, and
   identifying, in response to the second operation, the connection portal.

3. The method of claim 1, wherein determining a second electronic device further comprises:
   matching the target area with a preset target area of the first electronic device to obtain a preset target area; and
   searching the preset target area to determine the second electronic device corresponding to the preset target area.

4. The method of claim 1, further comprising determining, based on ultrasonic preset audio from the second electronic device, the preset positioning information.

5. The method of claim 1, further comprising before detecting the first operation, sending, by the first electronic device, a sharing instruction instructing the second electronic device to start a connection application.

6. The method of claim 1, further comprising before detecting the first operation, establishing, by the first electronic device the connection between the first electronic device and the second electronic device.

7. A first electronic device comprising:
   a memory configured to store instructions; and
   one or more processors coupled to the memory and configured to execute the instructions to cause the first electronic device to:
      display a first image comprising one or more shared files;
      detect, from a user, a first operation for content sharing;
      determine the one or more shared files in response to the first operation;
      detect, from the user, a second operation selecting a second electronic device;
      obtain, in response to the second operation, a second image;
      identify the second image to obtain a target area;
      obtain positioning information of a target object in the target area when a location of the one or more shared files is in the target area;
      compare the positioning information with preset positioning information of a second electronic device, wherein the preset positioning information resides in the first electronic device;
      identify the target object as the second electronic device when the positioning information is consistent with preset positioning information of the second electronic device;
      send, to the second electronic device, a connection request to establish a connection to the second electronic device;
      receive, from the second electronic device, a connection confirmation message; and
      send, to the second electronic device using the connection, the one or more shared files.

8. The first electronic device of claim 7, wherein the one or more processors are further configured to execute the instructions to cause the first electronic device to:
send, to the second electronic device in response to the first operation, a connection instruction configured to instruct the second electronic device to enable a connection portal of the second electronic device; and
identify, in response to the second operation, the connection portal.

9. The first electronic device of claim 7, wherein the first electronic device further comprises a plurality of preset target areas in a one-to-one correspondence to the second electronic device, and wherein the one or more processors are further configured to execute the instructions to cause the first electronic device to:
match the target area with a preset target area of the first device to obtain a preset target area that matches the target area; and
search the preset target area to determine the second electronic device corresponding to the preset target area.

10. The first electronic device of claim 7, wherein the one or more processors are further configured to execute the instructions to cause the first electronic device to determine, based on ultrasonic preset audio transmitted by the second electronic device, the preset positioning information.

11. The first electronic device of claim 7, wherein the one or more processors are further configured to execute the instructions to cause the first electronic device to, before detecting the first operation, send the second electronic device, a sharing instruction instructing the second electronic device to start a connection application.

12. The first electronic device of claim 7, wherein the one or more processors are further configured to execute the instructions to cause the first electronic device to establish the connection between the first electronic device and the second electronic device.

13. A computer program product comprising computer-executable instructions that are stored on a non-transitory computer-readable storage medium and that, when executed by one or more processors, cause a first electronic device to:
display a first image comprising one or more shared files;
detect, from a user, a first operation for content sharing;
determine, in response to the first operation, one or more shared files;
detect, from the user, a second operation selecting a second electronic device;
obtain, in response to the second operation, a second image;
identify the second image to obtain a target area;
obtain positioning information of a target object in the target area when a location of the one or more shared files is in the target area;
compare the positioning information with preset positioning information of a second electronic device, wherein the preset positioning information resides in the first electronic device;
identify the target object as the second electronic device when the positioning information is consistent with preset positioning information of the second electronic device;
send, to the second electronic device, a connection request to establish a connection to the second electronic device;
receive, from the second electronic device, a connection confirmation message; and
send, using the connection to the second electronic device, the one or more shared files.

14. The computer program product of claim 13, wherein the computer-executable instructions further cause the first electronic device to:
send, to the second electronic device in response to the first operation, a connection instruction configured to instruct the second electronic device to enable a connection portal; and
identify, in response to the second operation, the connection portal.

15. The computer program product of claim 13, wherein the computer-executable instructions further cause the first electronic device to:
match the target area with a preset target area having a one-to-one correspondence to the second electronic device to obtain a preset target area that matches the target area; and
search the preset target area to determine the second electronic device corresponding to the preset target area.

16. The computer program product of claim 13, wherein the computer-executable instructions further cause the first electronic device to determine, based on ultrasonic preset audio transmitted by the second electronic device, the positioning information of the second electronic device.

17. The computer program product of claim 13, wherein before detecting the first operation, the computer-executable instructions further cause the first electronic device to send, to the second electronic device, a sharing instruction instructing the second electronic device to start a connection application.

18. The computer program product of claim 13, wherein before detecting the first operation, the computer-executable instructions further cause the first electronic device to establish the connection between the first electronic device and the second electronic device.

19. The computer program product of claim 13, wherein the positioning information comprises direction and distance.

20. The computer program product of claim 13, wherein the computer-executable instructions further cause the first electronic device to generate ultrasonic preset audio in real time according to an ultrasonic preset audio request.

* * * * *